United States Patent Office 3,716,929
Patented Feb. 20, 1973

3,716,929
EDUCATIONAL SYSTEM FOR QUESTIONING A PLURALITY OF PUPILS SIMULTANEOUSLY
Fritz Barrabas, Bochum, Germany, assignor to Westfalische Bergewerkschaftskasse, Bochum, Germany
Filed Nov. 5, 1969, Ser. No. 870,546
Claims priority, application Germany, Nov. 5, 1968, P 18 06 913.1
Int. Cl. G09b 7/02
U.S. Cl. 35—48 R     17 Claims

ABSTRACT OF THE DISCLOSURE

Instructional system which affords the simultaneous questioning of a number of pupils by one teacher to determine the extent of their knowledge. Each pupil has a desk with answer keys. The teacher asking the questions has a desk with solution keys, as well as a pupils' monitor with visual indicators which can be extinguished by the teacher and which give a qualified repetition of an answer given by the pupil. The pupils' monitor has two visual indicators. During a given period of time the two indicators are selectively effective for each of the solutions fed in from the teacher's desk and for each pupil to qualify the given answer as false and as correct, respectively. The pupils' desks have visual indicators which can be switched on by the pupils and only qualify the answer previously given by the keys.

---

The invention relates to an educational system which makes it possible for a teacher to put questions to a plurality of pupils at the same time for the purpose of determining their knowledge. Each pupil has a pupil's desk provided with answer keys and the questioning teacher has a teacher's desk provided with solution keys and a pupil's monitor with visual indications, adapted to be erased from the teacher's desk for the qualified reproduction of the answers given by the pupil.

Such systems are used for teaching purposes, among other things, for the purpose of putting questions to the learner. The rationalizing effect on school education is that questions can be put to all the pupils simultaneously and that all the pupils can give answers simultaneously.

Such educational systems of electronic type are known. Their introduction in schools, however, is a question of the price, the efficiency of the system, and thus of the technical expense. For this reason, a correspondingly simple electrical connection of pupils' and teachers' desk and monitors is included.

One of the best known educational systems uses pupils' desks provided with four answer keys and a pupils' monitor which uses in each case one indicating lamp for each pupil. This lamp will light up when the key pressed by the pupil corresponds to the solution key pressed on the teacher's desk, that is, when the answer is correct. In this way, the pupil has only one opportunity to give an answer. Thus, the system limits the selection of a correct answer of the pupil from four possible answers. The pupils' monitor must be visible for all the pupils, because any indication is made centrally thereon. Therefore, this system is limited to frontal instruction; it does not permit any individual instruction. More extensive educational possibilities are offered by another of the well-known systems. It uses pupils' desks provided with four answer keys and a pupils' monitor having four visual indications coordinated to the answer keys in the form of illuminating figures. The figures change their color according to the qualification of the answer given by the pupil. The number of the possible answers in this system is as large as the possible combinations of the figures. However, this system also has a disadvantage, since the pupils can answer only once and there is no pupil check-back in the system, that is, only frontal instruction is possible.

It is the underlying object of the invention to eliminate the drawbacks and limitations of the well-known systems, and more particularly to provide an instructional system which makes it possible to achieve this object with four keys on the pupil's desk.

In accordance with the invention, the pupils' monitor exhibits two visual indications for each solution given from the teacher's desk for a predetermined period of time and for each pupil. One of the visual indications qualifies the given answer as correct, and the other one qualifies the given answer as wrong. Furthermore, the pupil's desks exhibit visual indications which can be operated by the pupil and which qualify only that answer which had previously been given by means of the keys.

If in such a system, lamps which extinguish or light are used as visual indicating means, it is recognizable whether the pupil has given a right or a wrong answer in his first attempt, because the one or the other lamp is operated. Furthermore, the judgment of the visual indications permits a determination of whether the pupil has given a plurality of answers and, finally, the right answer, because then both lamps are operated. Besides this, the non-operation of the two lamps indicates that the pupil has made no attempt to answer the question. The visual indications on the pupils' desks qualify only the pupil's last answer as correct or wrong. Thus, they may motivate the pupil to provide a possible correction, but they give no information regarding the indication on the pupils' monitor, which is only available to the teacher.

The system of the invention permits the pupil to give any number of answers. Furthermore, the pupil is prevented from manipulating the right answer on the pupils' monitor by "experimenting," because the answer is always qualified only as correct or wrong on the pupils' monitor, independently of the number of keys pressed by him.

Due to the adaptation to each individual pupil, the invention offers not only the possibility of frontal questioning for which the well-known systems are solely arranged, but for individual questioning by automatization of questioning and answering. For this purpose, it is practicable to provide each of the pupils' desks with an automatic solution feeding means and to arrange the pupils' monitor in such a manner that it can be connected with its visual indicating means from the teacher's desk to the pupils' desks, by-passing the solution keys which are operated by the teacher. The teacher may give his attention to those pupils who have difficulties in answering the questions. This also serves to rationalize and intensify the instruction.

Besides this, the pupils' desks can, according to the invention, be separated from the teacher's desk and the pupils' monitor, so that the pupil may test and instruct himself. In some cases, battery operation is provided for this purpose.

Some of the well-known instruction systems permit the storage of the results of a plurality of questions. The instruction system according to the invention makes it possible for the teacher to observe this at a glance, in which case the intermediate results are also visible. This is made possible by the fact that the pupils' monitor exhibits visual indications for a plurality of questions which are mainly arranged in vertical rows and which may be erased individually, in which case a horizontal row is provided for each pupil. The horizontal rows can also be erased individually.

The invention is thus based on the principle of the so-called selective answer method which is used with branched educational programs in which several plausible answers are offered to the pupil for selection. The invention makes it possible to give several selective answers in the case of the programmed instruction in order to request from the pupil a decision not only for one but also for several selective answers at the same time. In the case of the four existing keys, of which each one corresponds to an answer, fifteen wrong solutions can correspond to one correct solution, whereby the odds are great against guessing of the right solution.

Furthermore, the system according to the invention offers the advantage for the continuous exchange of information between pupil and teacher concerning the instructional results and the behavior of the pupil. In the case of programmed instruction and partially programmed instruction, the flow of information makes it possible for the pupil and the teacher to feed back and thus to bring the principle of the control circuit to an effect more than was the case up to now. Feeding back is effected via the pupils' monitor and via the answer lamps on the pupils' desks. The check-back indications required therefor are based, among other things, on the fact that the system compares desired values, which are, for example, the solutions keyed by the teacher in the case of frontal instructions, with actual values, which are the answers given by the pupils.

In connection with repeating, performance tests and examinations, the system of the invention serves not only the intensification of the instruction, but also the rationalizing by objectification of the teacher's functions.

The effect of rationalizing the system is also based, among other things, on the fact that questions can simultaneously be put to pupils and that the central station, comprising the pupils' monitor and the teacher's desk, simultaneously accepts and evaluates the check-back indications of the all pupils. In this case, all the pupils receive a corresponding check-back indication as learning intensification. Thus, those pupils who answered wrong are immediately caused to make a correction. At the same time, the instruction is again intensified thereby.

In the case of work with programmed books, the answer is compared by the pupil himself, and the pupil compares the given right solution with his own. In accordance with the invention, the answers are compared by the system described, so that the pupil does not receive the right solution after answering the question and is thus prevented from correcting to the correct answer. In this way, the pupil is simultaneously prevented from cheating.

In order that the invention may be readily carried into effect, it will now be described with reference to the accompanying drawings, wherein.

Figure 1:
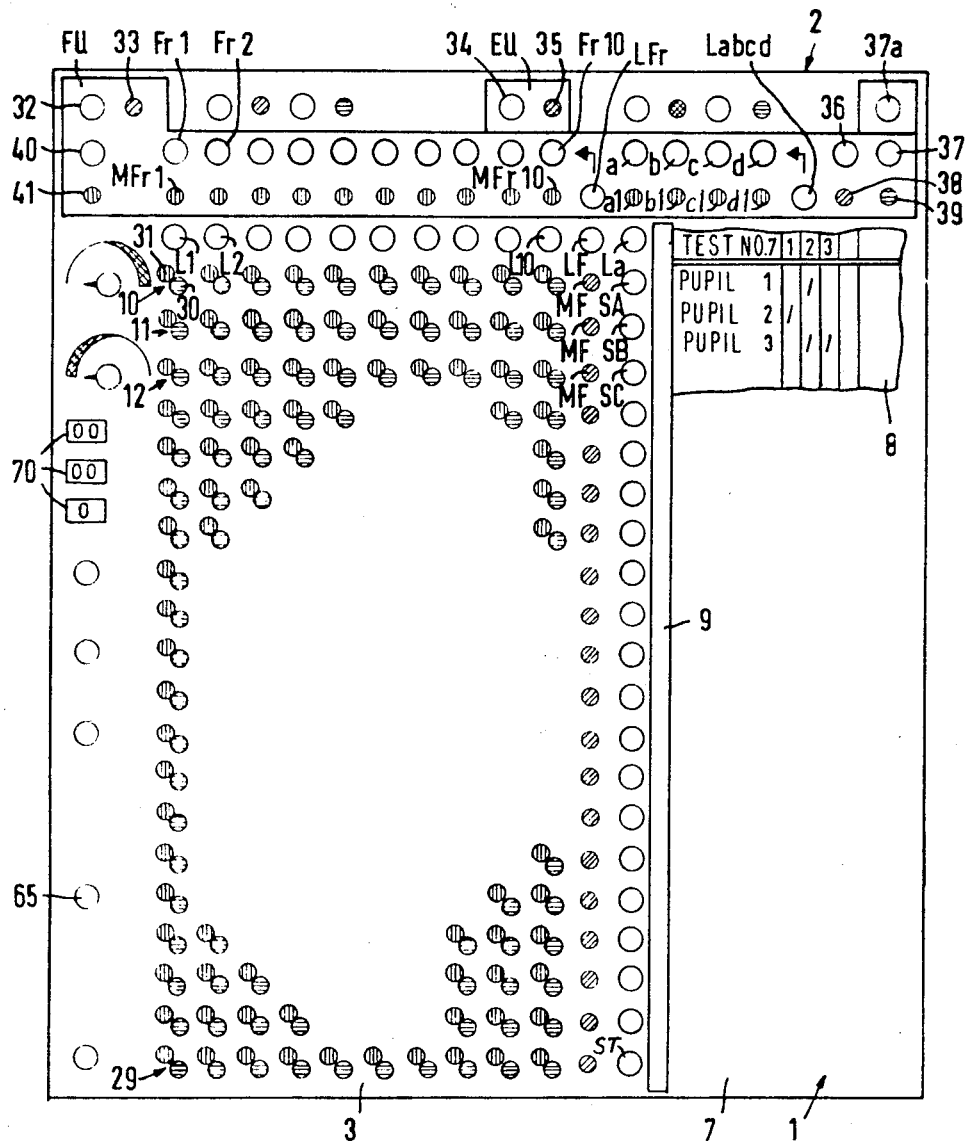
FIG. 1 shows a front view of the teacher's desk and the pupils' monitor of the educational system of the invention.

FIG. 1 shows the part of the educational system of the invention which is placed at the disposal of the teacher. In principle, the teacher's part 1 consists of two main components, the teacher's desk 2, which contains the operating components to be actuated by the teacher, and the pupils' monitor 3, which visually indicates the results delivered by the system. The pupils' monitor 3 may be separated from the teacher's desk 2 and may be present several times in the system of the invention. In examinations, special monitors may be placed at the disposal of individual members of the examining board.

Figure 2:
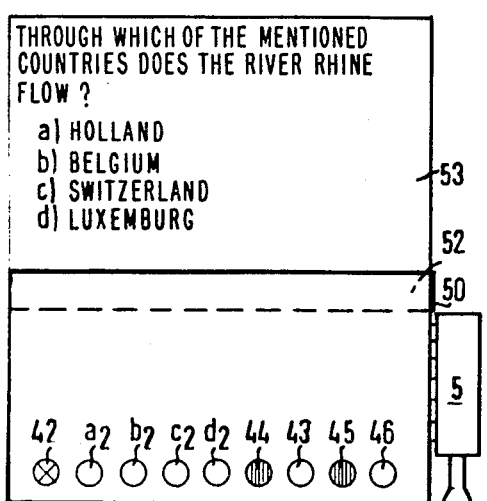
FIG. 2 is a front view of a pupil's desk with a test sheet on it.

In FIGS. 1 and 2, clear circles indicate resilient keys and hatched circles represent visual indicating means in the form of lamps. Vertical hatchings indicate yellow lamps, horizontal hatchings indicates red lamps, inclined hatchings indicate green lamps, and double-hatchings indicate blue lamps. The colors of the lamps are given only as an example; they may be selected as desired.

The word "keys" also means the use of switches.

The question asked of the pupils may be, for example:

Through which of the indicated countries does the river Rhine flow?

(a) The Netherlands
(b) Belgium
(c) Switzerland
(d) Luxembourg.

The answer to the question is correct if the countries listed under (a) to (d) are properly indicated.

To feed in the solutions (a) to (d), the teacher's desk is provided with resilient solutions keys $a$, $b$, $c$ and $d$ and control lamps $a1$, $b1$, $c1$, $d1$ placed thereunder.

In addition, the teacher's desk has question keys $Fr1$, $Fr2$ ... $Fr10$ for a series of questions of the aforementioned type.

Each pupil receives a pupil's desk having a terminal plug 5 for a connection cable 6, which connects to the teacher's desk. For answering the questions asked, the pupil's desk has four resilient keys which are designated $a2$, $b2$, $c2$, $d2$. It is up to the pupil to select and press the correct key.

The system described is designed for twenty pupils. A horizontal row of lamps 10, 11, 12 ... 29 is provided for each pupil. In addition, the teacher's desk includes a surface section 7 having a clamping strip 9 in which a check list 8 may be held. The pupils are listed on the check list.

The pupils' monitor has two lamps 30 and 31 for each question and for each pupil. In the example shown, the lamps 31 are yellow and the lamps 30 are red. The yellow lamp 31 qualifies the pupil's answer as correct, the red lamp 30 qualifies the pupil's answer as wrong. The lamp section on the pupils' monitor 3 is divided into vertical columns for each question and horizontal rows for each pupil. The lamps may be extinguished after each question by means of extinguishing keys L1, L2 ... L10 and for each pupil by means of extinguishing keys SA, SB ... ST.

At the end of each horizontal row of lamps there is a green indicating lamp MF, by which the pupil, among other things, can indicate that he has finished dealing with a problem during frontal instruction or with a group of ten questions during individual instruction. The vertical column of lamps MF may be extinguished by an extinguishing key LF.

For the frontal type of instruction, a key 32 and a lamp 33 are provided on the teacher's desk. A key 34 and an associated indicating lamp 35 are used for switching the system to individual instruction. To increase the ease of operation, the keys 32 and 34 are provided to simultaneously switch on the entire system. A key 37a is used for switching off the equipment.

The frontal instruction is initiated by pressing the key 32. When a key 36 is pressed during frontal instruction, the pupils' desks are connected for dealing with the next problem and are ready for questions and answers, after the correct solution had been previously fed into the system by pressing the corresponding solution keys in the key group a to d, and also after a specific vertical column of lamps on the pupils' monitor has been connected for receiving and indicating by pressing the corresponding key.

When the key 36 is pressed, lamps 42 on the pupils' desks are switched on, whereby the pupils are shown that they can begin dealing with the next problem.

Shortly before the end of the scheduled working time, which is monitored and controlled by a suitable timing device 70, the teacher, or, as the case may be, the timing device, can automatically warn the pupils that the lamps on the pupils' desks will again be extinguished after a previously determined period. This occurs by pressing or bridging a key 40, whereby a lamp 41 on the teacher's desk and the lamps 42 on the pupils' desks produce a blinking signal. The extinguishing occurs automatically after the end of the specific time period or in certain cases by means of a corresponding delay circuit.

The attention key 40 may be by-passed by a key 37 having an associated control lamp 39.

In addition, the pupil's desk has a control key 43, which serves as a questioning and indicating key for the pupil. After the pupil answers the question by operating the corresponding switches a2 to d2, a lamp 44 or 45 lights up when a control key 43 is pressed. This shows the pupil whether the answer was right or wrong.

The operation for individual instruction is initiated by pressing the key 34 on the teacher's desk. For this type of operation, the pupils' desks are provided on one side with a slot 50 with a pickup device. The slot 50 is for the insertion of a punched strip 52 which in the illustrated example is on an edge of a program or test sheet 53 given to the pupil. The punched strip 52 contains the coded correct answer, that is, the solution for the question on the program or test sheet 53 which is taken up by the system and which the system compares with the answer given by the pupil. The result of the comparison of answers is automatically evaluated by the system, so that the corresponding check-back indication may be given to the pupil by means of the lamps 44 or 45. The pupil may request the result of the comparison by pressing the control key 43.

When the control key 43 is pressed, the indication concerning the result of the answer given by the pupil occurs simultaneously and automatically and is supplied to the pupils' monitor 3.

Figure 11:
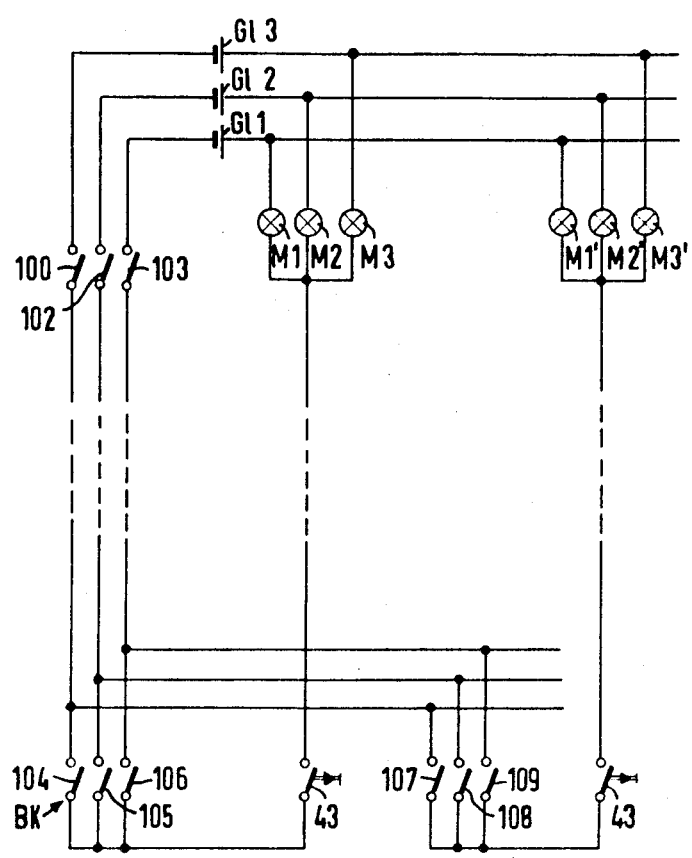
FIG. 11 is a circuit diagram of another embodiment of the check-back system of the educational system of the invention.

A central and an individual control are provided for this purpose. FIG. 11 shows in a simplified manner how the check-back indication from the pupil's desk is addressed to certain lamps on the pupils' monitor of the teacher's desk.

The addresses are either determined in common by the teacher from the central station for all pupils' desks by pressing the keys Fr1, Fr2, to Fr10, or the addressing is effected individually from each pupil's desk by means of the punched strips.

For the control from the pupil's desk, switches 100, 102, 103, etc. (FIG. 11) are operated by the question keys Fr1, Fr2, to Fr10 (FIG. 1) and are continuously maintained closed in the central station, so that the control can be effected by switches 104, 105, 106, etc. (FIG. 11) on the pupil's desk. To control an indicating lamp M1, for example, the switch 106 must be connected and the switches 104 and 105 must be opened.

To control the system from the central station, it is necessary that all corresponding switches 104, 105, 106 of the pupil's desk be closed. The control is then through the switches 100, 102 and 103.

The switches 100, 102 and 103 are setting switches which are operated by the teacher. For individual control they are bridged by relay switching elements.

The switches 104, 105 and 106 are constructed as blade contacts BK (FIGS. 6 and 7) and form part of the pickup device on the pupil's desk. The control is effected in this case by means of the punched strip for a program or test sheet in such a manner that, for example, by means of the punched holes, the contacts corresponding to the switch 106 are closed while the contacts corresponding to the switches 104 and 105 are separated from one another by a paper layer on the punched strip.

In the case of the central control, all the blade contacts are closed, due to the fact that no program or test sheet is inserted in the pickup device of the pupil's desk. The control from the central station is effected in common for all the pupils' desks. For this purpose, the pupils' desks are connected in parallel, as shown in FIG. 11.

For control by means of the punched strip, the closing of the switches 100, 102 and 103 results in voltage being applied to the input of all the pupils' desks, so that by insertion of different program sheets, different control orders may be given simultaneously for various pupils' desks. Thereby, for example, by the closing of the blade contact 106, the check-back indication of a pupil A may automatically by supplied to the lamp M1, and the blade contact 108 is simultaneously closed by another punched strip at the desk of a pupil B, so that the check-back indication of the pupil B may be addressed to the lamp M2 on the pupils' monitor (FIG. 11).

The circuit arrangement of FIG. 11 permits different reactions to be demanded simultaneously for the answering of questions by different pupils.

The common control from the central station is intended to be used for frontal instruction, whereas the individual control is for individual instruction. It is thereby possible, for example, for each pupil in working through the instruction programs to proceed at a speed commensurate with his learning ability, so that the personal rhythm of learning is not disturbed. This has the further advantage that various pupils may work through different instruction programs and test sheets simultaneously without the continuous flow of information between the pupils' desks and the pupils' monitor being affected. The teacher is continuously informed as to the learning progress of each pupil.

A fourth type of operation is provided in the illustrated system. In such operation, the pupils' desks are separately actuated. This is done by a battery, not shown in the figures. In this case, the punched program and test sheets are also used as shown in principle in FIG. 2.

Figure 4:
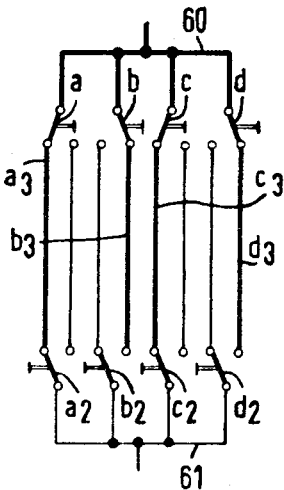
FIG. 4 is a circuit diagram of FIG. 3 after operation of the keys by the teacher.
Figure 3:
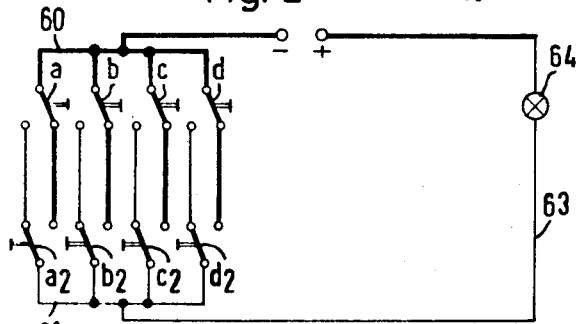
FIG. 3 is a circuit diagram of part of the educational system of the invention in the initial condition.

FIGS. 3 and 4 show how questions are asked by the teacher. In FIGS. 3 and 4, the switches which are to be operated by the teacher and correspond to the solution keys a, b, c, d are connected to a bus bar 60. The switches which correspond to the answering keys a2, b2, c2, d2 which are to be actuated by the pupil are connected to another bus bar 61 on the pupil's desk. Both buses 60 and 61 are connected in a circuit 63 which includes an indicating lamp 64. The indicating lamp 64 serves, however, only to explain the circuit arrangement. Furthermore, the lamp 64 is replaced by a transistor in the practical use of the system.

In a simplified arrangement, the pupil has to prevent the indicating lamp 64 from lighting up. This is achieved by the correct selection of the answer and by actuation of the corresponding switches.

For the initially asked questions, the correct answer is made up from the partial answers a and c. As shown in FIG. 4, the teacher has actuated the correct answer keys on the teacher's desk. In this case, the indicating lamp 64 lights up, since the current from the live bus 60 may flow to the bus 61 through the conductors a3 and c3. In contrast thereto, no current flows in the conductors b3 and d3.

The lamp 64 is extinguished only when the pupil presses the correct answer keys, that is the keys a2 and c2. Pressing all the keys is the same as pressing keys which give false answers or partial answers, and does not indicate a correct answer.

The pupil must thus disconnect the voltage applied to the circuit corresponding to each question, after the teacher has applied voltage to the circuit concerned by supplying the correct answer.

Figure 5:
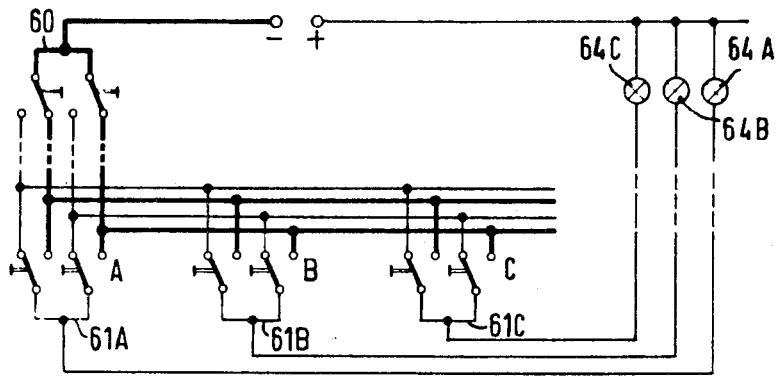
FIG. 5 is a circuit diagram of several pupils' desks of the educational system of the invention.

FIG. 5 shows the interconnection of the circuits allocated to each pupil with the keys a, b, c, d on the teacher's desk.

The pupils' desks are designated by A, B, C, etc. The indicating lamps for the pupils' desks A, B, C, etc. are designated by reference numerals corresponding to those of FIG. 3, with the suffix letters corresponding to the pupils' desks. The result is that a simple parallel circuit for the pupils' desks A, B, C suffices.

Also during individual instruction, the pupil must disconnect a circuit to which voltage has been previously applied in order to provide a correct answer.

Figure 6:
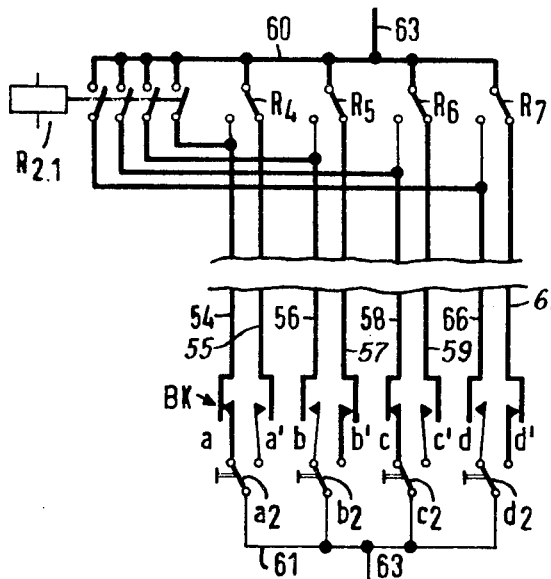
FIG. 6 is a circuit diagram of a system of the invention for individual instruction using a punched strip.

By means of the coded answer in the punched strip 52, several pickup contacts BK in FIG. 6 are closed. Others of the pickup contacts remain open. During individual instruction, voltage is continuously applied to all secondary contacts at the pupil's desk. As shown in FIG. 6, this is achieved by actuating the key 34 on the teacher's desk (FIG. 1), thereby energizing a relay R2.1. When the relay R2.1 is energized, it closes circuits 54, 56, 58 and 66. At the same time, however, question relays R4, R5, R6 and R7 are disconnected, so that circuits 55, 57, 59 and 67 remain closed. The answer may thereby be supplied from the pupil's desk, as hereinbefore described.

The answer is coded in the punched strip in a manner whereby the pickup contacts a, b', c, d' remain closed even after the punched strip is inserted. As a result, the pupil must press the keys a and c to disconnect the voltage; however, he must not actuate the keys b and d.

Figure 7:
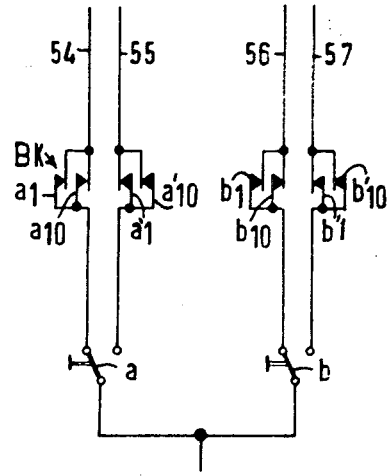
FIG. 7 is a circuit diagram of a system for coding the answers by the punched strip contacts.

To make it impossible for the pupil to decode the punching on the strips, the blade contacts in FIG. 7 are doubled compared to FIG. 6 wherein contacts $a1$, $a10$ and further contacts $a'1$ and $a'10$ are provided for the answers "a." The same numerals apply to the answers "b." It can be proven that there are eight-one different possibilities for coding the answer "a," as a result of which a coding such as could be memorized and decoded as needed by a pupil would rarely occur.

Figure 8:
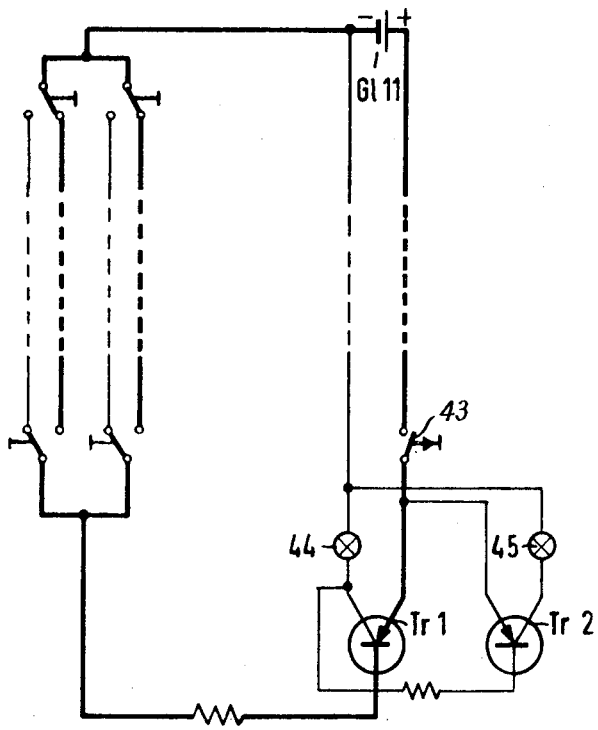
FIG. 8 is a circuit diagram of an embodiment of the check-back system of the educational system of the invention.

In accordance with the simplified arrangement of FIG. 3, the question is correctly answered as soon as the pupil causes the indicating lamp 64 to be extinguished. In FIG. 8, a conversion of the signal occurs through transistors $Tr1$ and $Tr2$ at the pupil's desk. When the resilient control key 43 (FIG. 2) is pressed and no current flows through the base or emitter of the transistor $Tr1$ in the circuit of a voltage source $Gl.11$, because the circuit is opened due to a correct pupil actuation of the switches $a2$ and $d2$ (FIG. 2), the transistor $Tr1$ becomes non-conductive and the transistor $Tr2$ thus becomes conductive. The check-back indication to the pupil is by the energization of the indicating lamp 45 as long as the pupil presses the control key 43.

If the pupil presses the control key 43 after an incorrect answer, a control current flows which makes the transistor $Tr1$ conductive, so that the transistor $Tr2$ becomes non-conductive. The "incorrect answer" indication is provided for the pupil by the energization of the indication lamp 44 (FIG. 2).

Figure 9:
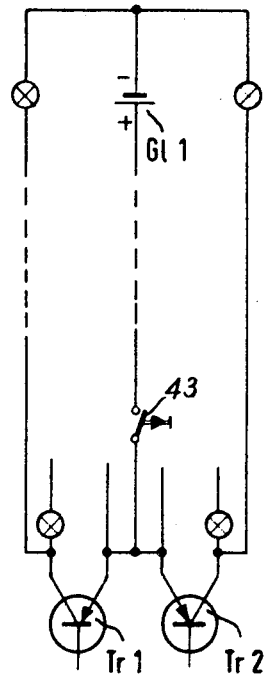
FIG. 9 is a circuit diagram of the system for indicating the correctness or incorrectness of the given answer to the pupils' monitor of the system of the invention.

FIG. 9 shows how the indication of the correctness or incorrectness of the given answer is further supplied to the pupils' monitor 3. When the answer is confirmed to the pupil, a current from a voltage source $Gl.1$ flows simultaneously through the transistor which is conductive at that instant and causes the corresponding lamps 30 or 31 on the monitor to light (FIG. 1).

Figure 10:
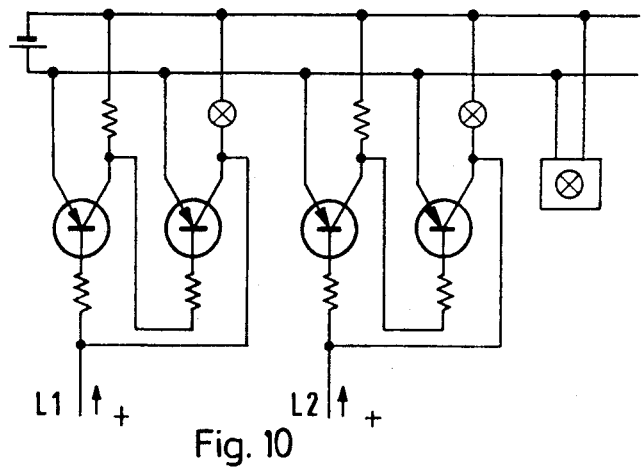
FIG. 10 is a circuit diagram of a system of the invention for storing of the result of the questions.

The storage of the result in the monitor is shown in principle. The indicating lamps on the monitor are switched to a "hold-in" connection by transistorized flip flop circuits. The flip flop circuits are so connected that when the system is switched on or repeatedly switched on, the left-hand transistors in FIG. 10 become conductive and the right-hand transistors become non-conductive, whereby the corresponding lamps are extinguished. A positive pulse via a conductor L1 or a conductor L2 is sufficient to trigger the bistable multivibrator or flip flop circuit and to thereby energize the lamps.

Furthermore, the lamps do not extinguish again, even when the pupil releases the control key 43 (FIGS. 2 and 11). It is thus achieved that the results of the pupil's reactions are stored and available to the teacher at any time. The energized indicating lamps which serve for storing the instruction results are not energized again after a momentary interruption of the current, since they are in a "hold-in" connection. A counter key 65 (FIG. 1) is provided for intentionally extinguishing the indicating lamps in order to prevent this effect from being disadvantageous if such a circuit is interrupted inadvertently, since this could cause the loss of the stored result. The counter key 65 must first be pressed to extinguish the lamps and is mounted on the teacher's desk spaced from the extinguishing keys.

The operation of the educational system of the invention thus needs no further explanations. The keys and lamps are arranged as shown in FIG. 1, and such arrangement is clear and facilitates operation. Furthermore, very little thought is required and only a few hand movements are necessary for operation, so that the teacher is considerably relieved of strain.

What I claim is:

1. A teaching system for the simultaneous questioning of a number of pupils by one teacher comprising a plurality of pupils' desks each having answer keys and visual indicating means for indicating the correctness of an answer and a teacher's desk, switching means on said teacher's desk for prestoring the answers and a pupils' monitor for providing extinguishable visual indications of the correctness of answers of the pupils said pupils' monitor comprising a plurality of pairs of indicating lamps (30 and 31) corresponding in number to the number of pupils and selected responses by each of said pupils for each question, one lamp (31) of each pair of lamps (30 and 31) indicating a pupil's answer as being correct when energized and the other lamp (30) of each pair of lamps indicating a pupil's answer as being incorrect when energized; a self-holding circuit connected to said pairs of indicating lamps, controllable from the teacher's desk and adapted to store at least the first given answer from each pupil to a given question; a plurality of manually operable answer keys ($a_2$ to $d_2$) at each pupil's desk electrically connected to corresponding pairs of indicating lamps on the pupil's monitor of the teacher's desk adapted to provide a visual indication as to the correctness of the answer; a pair of indicating lamps (44 and 45) on each pupil's desk for indicating the correctness of the response given by said pupil; and a clearing key on said teacher's desk connected to said indicating lamps operable when actuated to remove response indications from the monitor.

2. A teaching system as claimed in claim 1, further comprising an automatic solution feeder (52) at each pupil's desk, a plurality of question keys (a, b, c, d) at the teacher's desk and circuit means for connecting the indicating lamps of the pupils' monitor to the pupils' desk bypassing the question keys for the purpose of indicating the answers at the teacher's desk.

3. A teaching system as claimed in claim 2, further comprising a source of voltage connected between the question keys and the answer keys and parallel conductors connecting the question keys (a, b, c, d) to the answer keys ($a_2$ to $d_2$), whereby operated ones of said question keys switch a current flow through the keys connected to said conductors and the answers keys ($a_2$ to $d_2$) must be actuated to interrupt the current flow through the conductors concerned.

4. A teaching system as claimed in claim 1 wherein the pupils' desks are separated from the teacher's desk and the answer keys at each of said desks are manipulated individually.

5. A teaching system as claimed in claim 1 wherein the pairs of indicating lamps for each pupil are provided in the pupils' monitor in a horizontal row, the horizontal rows being individually extinguishable, each vertical column of the pairs of indicating lamps representing a different question.

6. A teaching system as claimed in claim 5, further comprising a plurality of annunciation indicating lamps (MF) in the pupils' monitor each corresponding to one of said horizontal rows of indicating lamps, and means for operating the annunciation indicating lamps when an answer is given by the pupil.

7. A teaching system as claimed in claim 5, further comprising a plurality of annunciation indicating lamps (MF) in the pupils' monitor each corresponding to one of said horizontal rows of indicating lamps, means connecting each annunciation indicating lamp to a corresponding one of the pupils' desks for operation by the pupil and an extinguishing key (LF) connected to the annunciation indicating lamp connecting means for deenergizing the annunciation indicating lamps.

8. A teaching system as claimed in claim 1 further comprising resilient keys (L1, L2 . . . ; SA, SB . . .) at the teacher's desk and a plurality of relays, the resilient keys switching the relays to a "hold-in" connection to provide automatic switch-over for a change in the method of operation (FU; EU).

9. A teaching system as claimed in claim 1 further comprising a clamping strip (9) on the pupils' monitor of the teacher's desk for insertion of a check-list (8) for identifying said pupils.

10. A teaching system as claimed in claim 1 wherein the indicating lamps of the pupils' monitor have different colors.

11. A teaching system as claimed in claim 1 wherein each lamp of each pair of indicating lamps is staggered with respect to the other.

12. A teaching system as claimed in claim 1 further comprising an indicating lamp (42) on each pupils' desk for indicating when the system is in condition for questioning and means at the teacher's desk connected to the indicating lamps for controlling the indicating lamp at each pupil's desk to give a blinking signal towards the end of a specific period of time allowed for answering a question.

13. A teaching system as claimed in claim 1 further comprising a punched strip pickup device (50) at each pupil's desk for automatic feed-in of the pupils' answers.

14. A teaching system as claimed in claim 13, further comprising a test sheet (53) which includes a punched strip at each pupil's desk.

15. A teaching system as claimed in claim 1 further comprising a plurality of punched strip devices (50) at each pupil's desk each including a number of contacts whereby each pupil upon answering a question by depressing one of said answer keys completes an electrical circuit by means of said punched strip.

16. A teaching system as claimed in claim 15 further comprising four contacts ($a1$, $a10$; $a'1$, $a'10$) for each partial answer ("$a$").

17. A teaching system as claimed in claim 1 further comprising means for maintaining the energization of the indicating lamps of the pupils' monitor operated by a pupil via the answer keys.

References Cited
UNITED STATES PATENTS

| | | | |
|---|---|---|---|
| 3,186,109 | 6/1965 | Brinton | 35—48 X |
| 3,190,014 | 6/1965 | Rhodes | 35—48 |
| 3,199,230 | 8/1965 | Sylvester et al. | 35—48 |
| 3,300,876 | 1/1967 | Johannsen | 35—9 |
| 3,314,172 | 4/1967 | Boyett | 35—48 |
| 3,343,278 | 9/1967 | Jermundson | 35—9 |
| 3,421,231 | 1/1969 | Kane | 35—9 |
| 3,482,329 | 12/1969 | Le Marr | 35—9 |
| 3,121,959 | 2/1964 | Uttal | 35—9 |

ROBERT W. MICHELL, Primary Examiner

J. H. WOLFF, Assistant Examiner